US012241972B2

(12) United States Patent
Takaki et al.

(10) Patent No.: US 12,241,972 B2
(45) Date of Patent: Mar. 4, 2025

(54) COLLISION AVOIDANCE ASSISTANCE DEVICE, STORAGE MEDIUM, AND COLLISION AVOIDANCE ASSISTANCE METHOD

(71) Applicant: DENSO CORPORATION, Kariya (JP)

(72) Inventors: Ryo Takaki, Kariya (JP); Yosuke Ito, Kariya (JP); Kei Kamiya, Kariya (JP); Toru Takahashi, Kariya (JP); Shogo Matsunaga, Kariya (JP); Takaharu Oguri, Kariya (JP); Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 577 days.

(21) Appl. No.: 16/986,529

(22) Filed: Aug. 6, 2020

(65) Prior Publication Data

US 2020/0361454 A1  Nov. 19, 2020

Related U.S. Application Data

(63) Continuation of application No. PCT/JP2018/047870, filed on Dec. 26, 2018.

(30) Foreign Application Priority Data

Feb. 8, 2018  (JP) .................................. 2018-020582

(51) Int. Cl.
*G01S 13/931* (2020.01)
*B60W 30/09* (2012.01)
(Continued)

(52) U.S. Cl.
CPC ........... *G01S 13/931* (2013.01); *B60W 30/09* (2013.01); *B60W 30/095* (2013.01);
(Continued)

(58) Field of Classification Search
CPC .. B60W 30/095; B60W 30/09; B60W 40/072; B60W 50/14; G06V 20/58; G06V 20/588; B60Q 1/525; G01S 13/931
See application file for complete search history.

(56) References Cited

U.S. PATENT DOCUMENTS 11,458,912 B2 * 10/2022 Kroeger ................ G01S 7/4021
2012/0078498 A1 *  3/2012 Iwasaki ................. B60W 10/20
                                                                  701/300
(Continued)

FOREIGN PATENT DOCUMENTS

DE         10029874    *  6/2010   ......... B62D 15/0265
DE       102016100736  *  8/2016   ........... B60W 30/00
(Continued)

*Primary Examiner* — Joan T Goodbody
(74) *Attorney, Agent, or Firm* — Maschoff Brennan (57) ABSTRACT

A collision avoidance assistance device includes a first determination section that determines a probability that a vehicle changes course, by using a recognition result of a road structure and a detection result by internal field sensors, a second determination section that determines a probability that the vehicle changes course, by using information related to a traveling situation output, a decision section that decides an operation mode of collision avoidance assistance using a collision avoidance assistance mechanism, by using a combination of a determination result of the first determination section and a determination result of the second determination section, and an assistance section that performs a process for controlling the collision avoidance assistance mechanism in the operation mode that has been decided by the decision section, upon detection of a collision probability with an obstacle using the information output by information output devices.

21 Claims, 7 Drawing Sheets

(51) Int. Cl.
*B60W 30/095* (2012.01)
*B60W 40/072* (2012.01)
*B60W 50/14* (2020.01)
*G06V 20/56* (2022.01)
*G06V 20/58* (2022.01)

(52) U.S. Cl.
CPC .......... *B60W 40/072* (2013.01); *B60W 50/14* (2013.01); *G06V 20/58* (2022.01); *G06V 20/588* (2022.01); *B60W 2050/143* (2013.01); *B60W 2420/403* (2013.01); *B60W 2420/408* (2024.01); *B60W 2554/801* (2020.02); *B60W 2556/50* (2020.02); *G01S 2013/9327* (2020.01)

(56) References Cited

U.S. PATENT DOCUMENTS

2015/0329046 A1\* 11/2015 Igarashi ................. G08G 1/166
340/435
2016/0355181 A1\* 12/2016 Morales Teraoka ... G08G 1/166

FOREIGN PATENT DOCUMENTS

| JP | 2006-293539 A | 10/2006 | |
|---|---|---|---|
| JP | 2011-133965 A | 7/2011 | |
| JP | 2014093039 | \* 5/2014 | ............... G08G 1/16 |

\* cited by examiner

| | | DETERMINATION BASED ON INTERNAL FIELD SENSORS | | |
|---|---|---|---|---|
| | | HIGH | MEDIUM | LOW |
| DETERMINATION BASED ON TRAVELING SITUATION | HIGH | STRONG | MEDIUM | WEAK |
| | MEDIUM | MEDIUM | MEDIUM | WEAK |
| | LOW | WEAK | WEAK | WEAK |

COLLISION AVOIDANCE ASSISTANCE DEVICE, STORAGE MEDIUM, AND COLLISION AVOIDANCE ASSISTANCE METHOD

CROSS-REFERENCE TO RELATED APPLICATION

This application is based on and claims the benefit of priority from earlier Japanese Patent Application No. 2018-020582 filed Feb. 8, 2018, the description of which is incorporated herein by reference.

BACKGROUND

Technical Field

The present disclosure relates to assistance in collision avoidance.

Related Art

A technique of enhancing safety during lane change, by issuing an alarm in accordance with a collision probability with a following vehicle during lane change, is disclosed.

SUMMARY

An aspect of the present disclosure is a collision avoidance assistance device of a vehicle. The vehicle includes: information output devices that output information for detecting an obstacle, information for recognizing a road structure in a traveling direction, and information related to a traveling situation of the vehicle; internal field sensors that detect a state quantity of the vehicle; and a collision avoidance assistance mechanism for assisting in avoidance of a collision with the obstacle. The collision avoidance assistance device includes: a first determination section that determines a probability that the vehicle changes course, by using a recognition result of the road structure by the information output devices and a detection result by the internal field sensors; a second determination section that determines the probability that the vehicle changes course, by using the information related to the traveling situation output by the information output devices; a decision section that decides an operation mode of collision avoidance assistance using the collision avoidance assistance mechanism, by using a combination of a determination result of the first determination section and a determination result of the second determination section; and an assistance section that performs a process for controlling the collision avoidance assistance mechanism in the operation mode that has been decided by the decision section, upon detection of a collision probability with the obstacle using the information output by the information output devices.

DETAILED DESCRIPTION OF THE PREFERRED EMBODIMENTS

JP 2011-133965 A discloses a technique of enhancing safety during lane change, by issuing an alarm in accordance with a collision probability with a following vehicle during lane change. Specifically, in a case where the following vehicle is present, whether the driver of an own vehicle has an intention of changing lanes is determined. When it is determined that the driver has the intention of changing the lanes, the blinker is automatically set to ON and an alarm controlled by an alarm actuator is set to ON in order to inform the driver of the collision probability with the following vehicle.

In JP 2011-133965 A, whether the driver has the intention of changing the lanes is determined based on a steering state of the steering wheel, manipulated by the driver, that has been acquired from a steering angle sensor. Even when the steering wheel is manipulated, however, the driver does not always have the intention of changing the lanes. This might cause a problem that an alarm is issued, though the driver has no intention of changing the lanes. Such a problem is not limited to the lane change, and is common among course changes in general including making a turn and the like.

In consideration of the above circumstances, the present disclosure provides a measure to estimate the driver's intention of changing course appropriately, and in addition, to provide assistance in collision avoidance appropriately.

Figure 1:
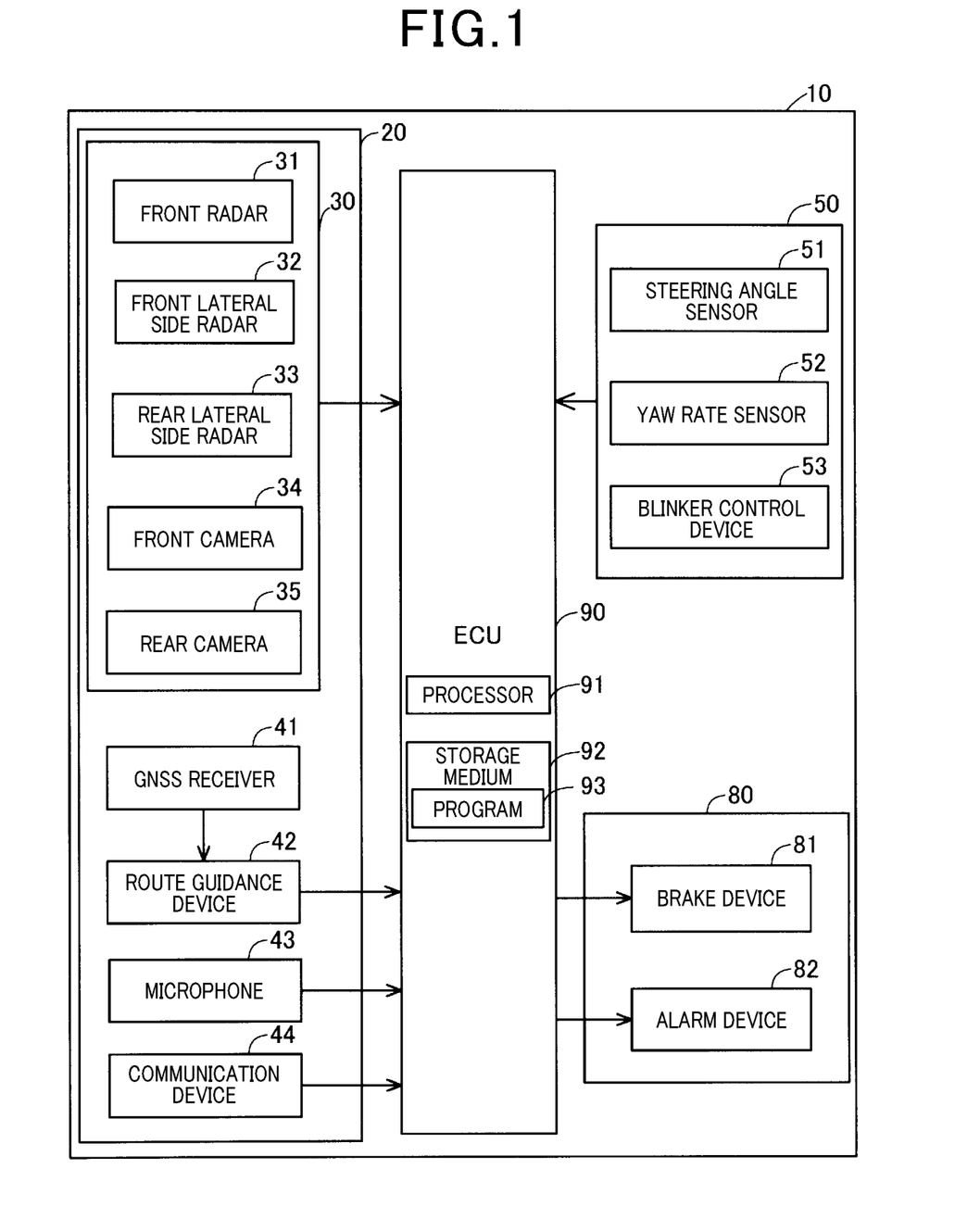
FIG. 1 is a block configuration diagram illustrating an internal structure of an automobile.

As illustrated in FIG. 1, a vehicle 10 includes information output devices 20, internal field sensors 50, a collision avoidance assistance mechanism 80, and an ECU 90. The vehicle 10 is a four-wheel automobile.

The information output devices 20 include external field sensors 30, a GNSS receiver 41, a route guidance device 42, a microphone 43, and a communication device 44. These components each have a function of outputting information generated by acquisition or calculation.

The external field sensors 30 acquire information for detecting an obstacle outside the vehicle, and output the acquired information. The external field sensors 30, in the present embodiment, are constituted by a front radar 31, two front lateral side radars 32, two rear lateral side radars 33, a front camera 34, and a rear camera 35. The front radar 31 is a millimeter-wave radar operating at a frequency of 77 GHz. The front lateral side radars 32 and the rear lateral side radars 33 are all millimeter-wave radars operating at a frequency of 24 GHz. The front camera 34 and the rear camera 35 are both monocular cameras. It is noted that the external field sensors 30 are not limited to these sensors.

Figure 2:
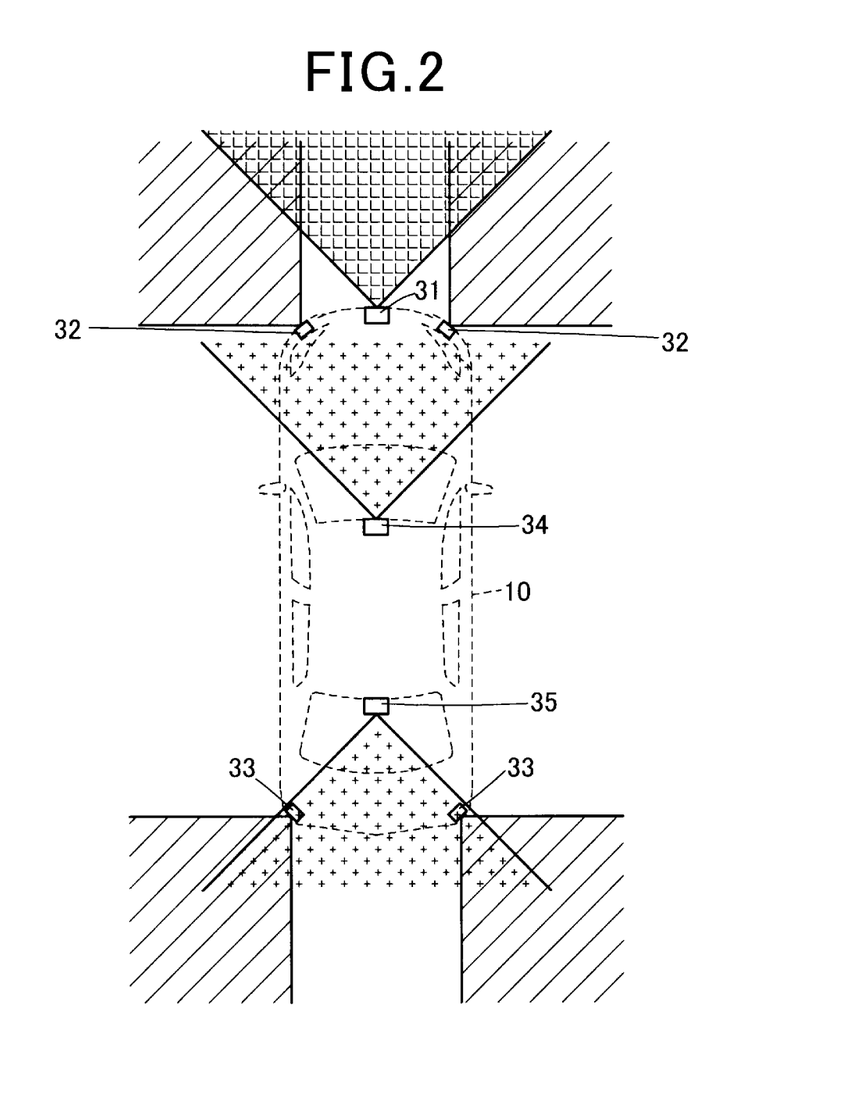
FIG. 2 is a view illustrating sensing ranges of external field sensors.

As illustrated in FIG. 2, the front radar 31 senses a range (e.g., a range of ±45 degrees) in which the front side of the vehicle 10 is set at the center. The front lateral side radars 32 respectively sense ranges (e.g., ranges of ±45 degrees) in which the front lateral sides of the vehicle 10 are set at the center. The front lateral sides of the vehicle 10 include one range in which 45-degree diagonal front right of the vehicle 10 is set at the center and the other range in which 45-degree diagonal front left of the vehicle 10 is set at the center. The rear lateral side radars 33 respectively sense ranges (e.g., ranges of ±45 degrees) in which the rear lateral sides of the vehicle 10 are set at the center. The rear lateral sides of the vehicle 10 include one range in which 45-degree diagonal rear right of the vehicle 10 is set at the center and the other range in which 45-degree diagonal rear left of the vehicle 10 is set at the center. The imaging range of the front camera 34 is a range in which the front side of the vehicle 10 is set at the center. The imaging range of the rear camera 35 is a range in which the rear side of the vehicle 10 is set at the center. It is noted that the sensing ranges of the radars and the imaging ranges of the cameras are not limited to the above ones.

The GNSS receiver 41 receives radio waves from plural navigation satellites. The route guidance device 42 displays the current location, and performs route guidance, by using information obtained from the radio waves that the GNSS receiver 41 has acquired.

The microphone 43 acquires voices inside the vehicle. The communication device 44 has a function of performing vehicle-to-vehicle communication, and has a function of performing road-to-vehicle communication.

The internal field sensors 50 are constituted by sensors for respectively sensing state quantities of the own vehicle. The internal field sensors 50 include, for example, a steering angle sensor 51 for detecting a steering angle of the vehicle 10, a yaw rate sensor 52 for detecting a yaw rate of the vehicle 10, and a blinker control device 53. The blinker control device 53 causes the blinker of the vehicle 10 to flash or turn off. The blinker control device 53 is capable of outputting information on whether the blinker is flashing or not. Hence, in the present embodiment, the blinker control device 53 is included in the internal field sensors 50.

The collision avoidance assistance mechanism 80 includes a brake device 81 and an alarm device 82. The brake device 81 includes a foot brake and a brake ECU. The foot brake is a brake mechanism for braking in accordance with a stepped-on amount of the brake pedal. Even if the brake pedal is not depressed, the brake ECU causes the foot brake to work when the ECU 90 gives an instruction. The foot brake working in such a manner is referred to as automatic brake.

The alarm device 82 alarms the driver about a collision probability. The alarm issued by the alarm device 82 includes at least one of an alarm sound output, seatbelt fastening, and displaying on a head-up display.

The ECU 90 (computer) includes a processor 91 and a storage medium 92. The storage medium 92 is, for example, a non-transitory tangible computer readable storage medium such as a semiconductor memory. The storage medium 92 stores a program for implementing a collision avoidance assistance process described later. The processor 91 executes the program stored in the storage medium 92, and thus the ECU 90 performs the process for implementing a collision avoidance assistance method. Specifically, the ECU 90 acquires information from the information output devices 20 and the internal field sensors 50, and controls the collision avoidance assistance mechanism 80.

Figure 3:
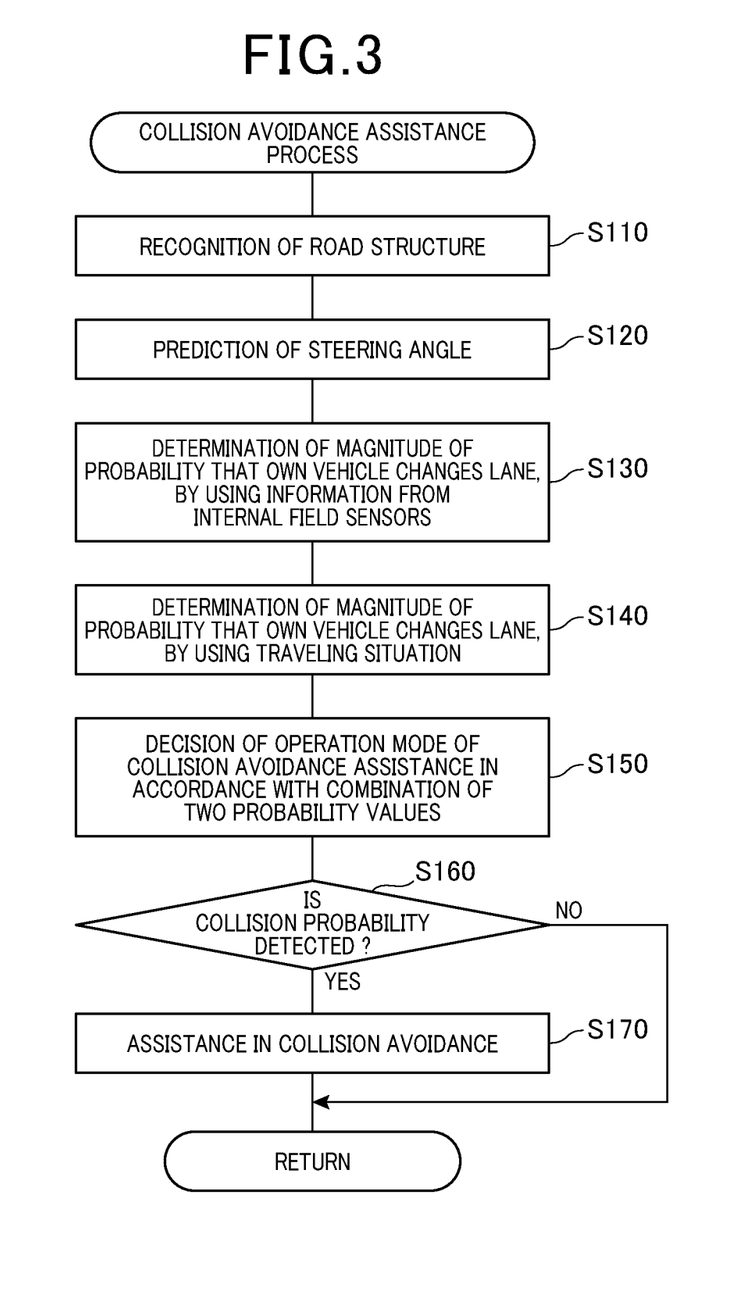
FIG. 3 is a flowchart illustrating a collision avoidance assistance process.

The collision avoidance assistance process illustrated in FIG. 3 is performed in a repeated manner by the ECU 90 at least while the vehicle 10 is traveling.

First, as S110, the ECU 90 recognizes a road structure in the traveling direction. The road structure denotes information indicating whether the road runs straight or is curved and to what extent the road is curved in a case where the road is curved.

The ECU 90, in the present embodiment, performs S110 by integrating an analysis result of an image captured by the front camera 34 with information input from the route guidance device 42. The information input from the route guidance device 42 in S110 includes information indicating the latitude and longitude of a current location and a curvature of the road in the traveling direction.

The analysis of the image captured by the front camera 34 is conducted for a white line defining a lane, a location of a preceding vehicle, and the like. Accordingly, the curvature of the road in the traveling direction is obtained as an analysis result. Since a straight road can be represented as zero curvature, the curvature of the road in the traveling direction can indicate the degree of a curve in a case where the road is curved and whether the road runs straight or is curved. In this manner, the use of the route guidance device 42 and the front camera 34 enables the recognition of the road structure with high accuracy.

In another embodiment, without using the image captured by the front camera 34, the information input from the route guidance device 42 may be used for performing S110. In yet another embodiment, the ECU 90 may recognize the road structure only from the analysis of the image captured by the front camera 34.

Next, proceeding to S120, the ECU 90 predicts a change in steering angle over time, when traveling along the road is assumed.

Next, proceeding to S130, the ECU 90 determines the magnitude of a probability that the own vehicle makes a course change, by using the predicted value of the steering angle obtained in S120 and the information from the internal field sensors 50. Hereinafter, the determination in S130 is referred to as a first determination. The course change in the present embodiment denotes making a turn. Making a turn includes a U-turn, also. The ECU 90 determines the probability of making a turn with three stages of probability values including high, medium, and low, based on the steering angle, the yaw rate, and the flashing state of the blinker. The probability of making a turn in the present embodiment means likelihood that the driver intends to make a turn and is manipulating the steering wheel, the accelerator pedal, and the like.

Figure 4:
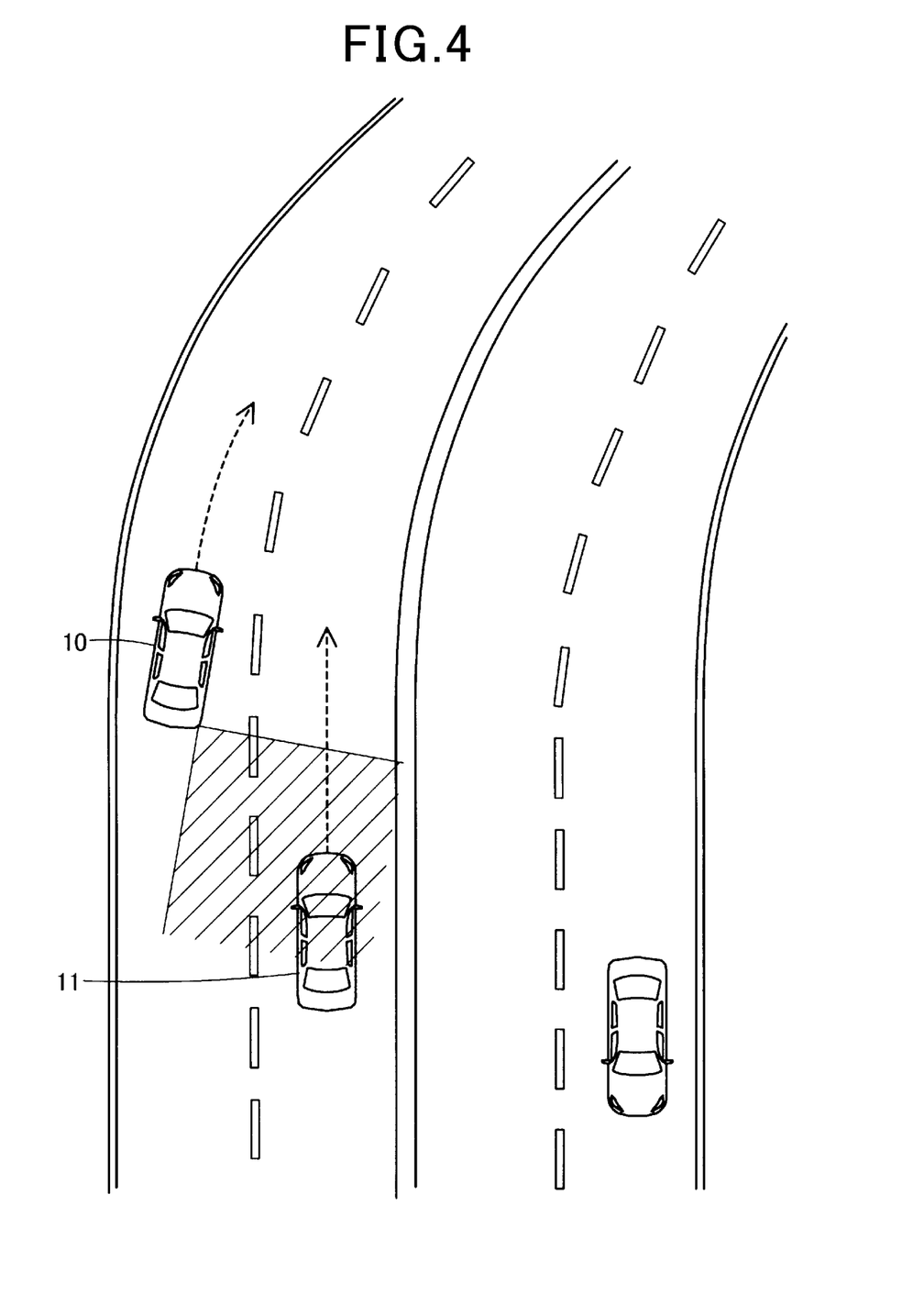
FIG. 4 is a view illustrating a situation in which the automobile is traveling along a curve.

As illustrated in FIG. 4, in traveling along the curved road, the value indicated by the steering angle and the yaw rate is approximate to the predicted value of the steering angle. In such a case, in S130, the probability of making a turn is determined to be low.

Figure 5:
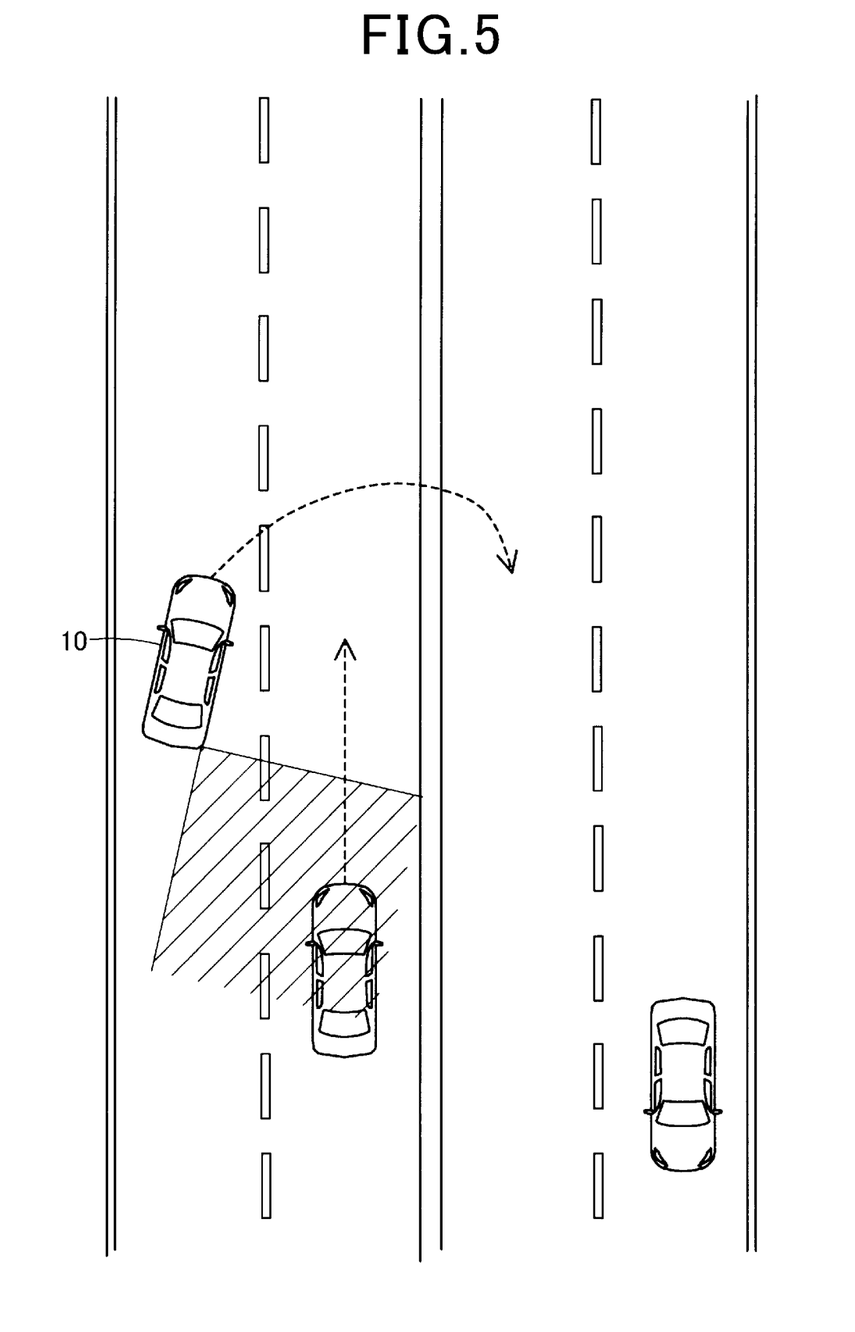
FIG. 5 is a view illustrating a situation in which the automobile that has been parked on a road is trying to make a turn.

As illustrated in FIG. 5, in a case where the steering wheel is being manipulated to make a turn on a straight road, the steering angle and the yaw rate are greater than those in the case of traveling along the straight road. Hence, in S130, the probability of making a turn is determined to be high. When the right blinker is flashing or the left and right blinkers are flashing, the probability of making a turn tends to be determined to be higher. The left and right blinkers flash when a hazard lamp switch installed in the vehicle 10 is pushed.

Next, proceeding to S140, the ECU 90 determines the probability of the course change by using information related to a traveling situation. Hereinafter, the determination in S140 is referred to as a second determination. The information related to the traveling situation is, for example, a guide route (planned route). Specifically, in a case where the vehicle has traveled on a different route from the guide route set by the route guidance device 42, the probability of the course change is determined to be higher than that in the case where the vehicle is traveling along the guide route.

Figure 6:
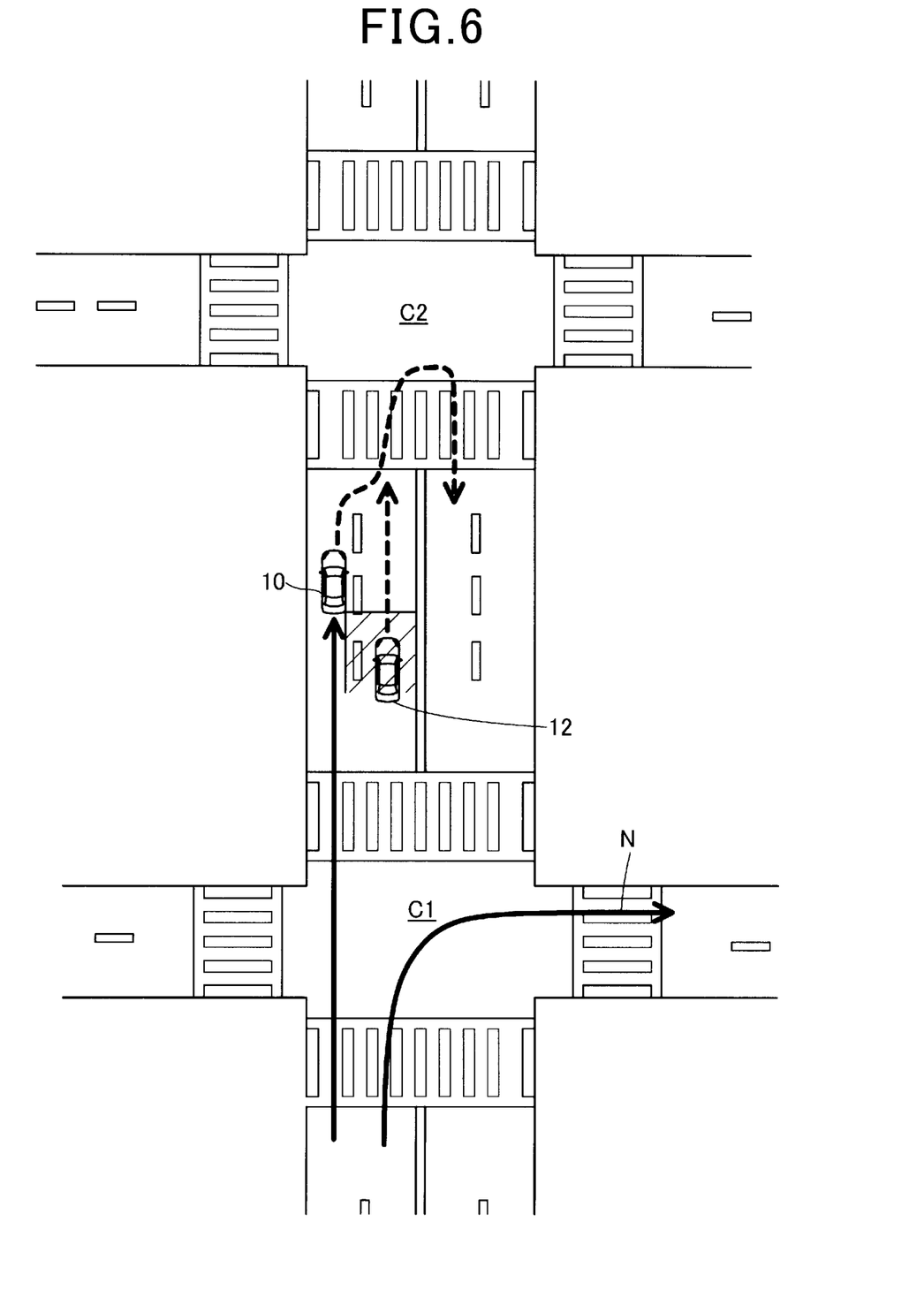
FIG. 6 is a view illustrating a situation in which the automobile travels on a route different from a guide route.

As illustrated in FIG. 6, for example, in a case where a guide route N is a route of turning to the right at an intersection C1, it is assumed that the vehicle 10 has traveled straight through the intersection C1. In this case, if the vehicle 10 then enters an intersection C2 and makes a turn there, the vehicle 10 can return to the intersection C1. Hence, there is a probability that the driver tries to make a turn at the intersection C2 in order to return to the guide route N. On the assumption of such a situation, in the present embodiment, in the case where the vehicle has traveled on a different route from the guide route, the probability of the course change is determined to be higher.

The period during which the probability of the course change is determined to be high continues from the time immediately after the vehicle departs from the guide route to the time when the probability of making a turn in order to return to the guide route becomes lower. Whether the probability of making a turn in order to return to the guide route becomes lower is determined by using an elapsed time and a traveled distance after the vehicle departs from the guide route, a determination whether the vehicle is traveling in accordance with a guide route that has been newly retrieved, or the like.

Figure 7:
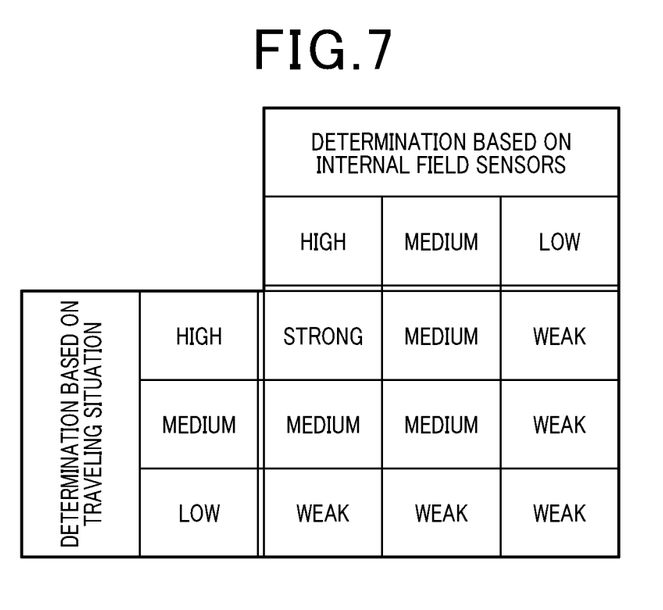
FIG. 7 is a diagram illustrating relations between two types of probability values and operation modes of collision avoidance assistance.

Next, proceeding to S150, the ECU 90 decides (selects) an operation mode of collision avoidance assistance according to a combination of the probability values that have been determined in the above-described two methods. Specifically, as illustrated in FIG. 7, the operation mode of the collision avoidance assistance is decided in accordance with a lower one of the probability values that have been determined in the above-described two methods. That is, in a case where either one of the probabilities that have been determined in the above-described two methods is low, the operation mode is set to weak. The weak operation mode is the mode of an initial setting.

In a case of a medium operation mode, automatic brake can work even at a probability that does not work in the weak operation mode, and in addition, an alarm is issued by the alarm device 82 at an earlier timing than the case of the weak operation mode. In a case of a strong operation mode, the automatic brake can work even at a probability that does not work in the medium operation mode, and in addition, the alarm is issued by the alarm device 82 at an earlier timing than the case of the medium operation mode.

Next, proceeding to S160, the ECU 90 determines whether the collision probability with an obstacle has been detected. The obstacle includes an automobile, a two-wheel vehicle, a pedestrian, and the like. The ECU 90 determines YES in S160, upon detection of the collision probability. Proceeding to S170, the ECU 90 assists in collision avoidance. Then, the process returns to S110. Upon not detecting the collision probability, the ECU determines NO in S160 and the process returns to S110.

According to the present embodiment, the collision avoidance assistance can be carried out more appropriately than an embodiment in which only either one of the probability values determined in the two determination methods is used.

In the case of the situation illustrated in FIG. 6, for example, at a timing immediately after the vehicle 10 passed through the intersection C1, the probability value in the second determination becomes high. At this timing, however, the vehicle 10 is traveling straight. Hence, the collision probability with a vehicle 12, which is traveling in an adjacent lane, is not so high. Thus, at this timing, the weak operation mode is desirable. In the present embodiment, at the timing immediately after the vehicle passed through the intersection C1, the probability value in the first determination is low and the operation mode becomes weak, accordingly.

Subsequently, the driver turns the steering wheel to the right, the vehicle 10 starts turning to the right, and then the probability value in the first determination becomes medium. In the case illustrated in FIG. 6, the probability value in the second determination is kept high, at least until the vehicle 10 enters the intersection C2. As a result, when the vehicle 10 starts turning to the right, the operation mode becomes medium. When the vehicle 10 further turns to the right, the probability value in the first determination becomes high. As a result, the operation mode becomes strong. In the case of a medium or strong operation mode, the probability of being capable of avoiding a collision with the vehicle 12 becomes higher than the case of the weak operation mode. To achieve such collision avoidance, the provision of the rear lateral side radar 33 is beneficial.

In the case of the situation illustrated in FIG. 4, on the other hand, the probability of the course change is determined to be low in the first determination. For this reason, even if a vehicle 11, which is traveling in an adjacent lane, is approaching the vehicle 10, the operation mode is kept weak. Accordingly, implementation of strong collision avoidance assistance more than necessary can be prevented.

A second embodiment will be described. The description of the second embodiment will be given mainly for differences from the first embodiment. Unless otherwise specified, the configurations are the same as those of the first embodiment.

The ECU 90, in the present embodiment, as the information used for the second determination in S140, voice information that has been acquired from the microphone 43 is used in addition to the information that has been acquired from the route guidance device 42. The voice information is one type of the information related to the traveling situation.

To be specific, the ECU 90 analyzes the voice information that has been acquired from the microphone 43, and determines whether a predefined word or phrase is included. The predefined word or phrase is, for example, "Make a turn here!", "Make a U-turn!", or the like, which is a word or phrase that means a request for the course change. The ECU 90, upon determination that such a word or phrase is included, makes the probability value of the second determination higher in accordance with the meanings of the content, the loudness of the voice, or the like.

According to the present embodiment, the intention of the passenger on the vehicle 10 can be estimated in a more accurate manner.

A third embodiment will be described. The description of the third embodiment will be given mainly for differences from the first embodiment. Unless otherwise specified, the configurations are the same as those of the first embodiment.

The ECU 90, in the present embodiment, in addition to the information that has been collected by the external field sensors 30, at least any of information acquired by vehicle-to-vehicle communication and information acquired by road-to-vehicle communication is considered for determining the collision probability in S160.

The situation of FIG. 6 will be described as an example. In the case of using the vehicle-to-vehicle communication, the ECU 90 determines the collision probability by communicating with the vehicle 12. In the case of using the road-to-vehicle communication, the ECU 90 communicates with a road-side device installed in the intersection C2. This allows a probability of being capable of detecting a collision probability with an obstacle that cannot be detected by the external field sensors 30. Examples of the above-described obstacle may include an oncoming vehicle that is traveling straight to pass through the intersection C2.

According to the present embodiment, the probability can be detected in a more accurate manner.

The ECU 90 corresponds to a collision avoidance assistance device, S130 performed by the ECU 90 corresponds to a first determination section, S140 performed by the ECU 90 corresponds to a second determination section, S150 performed by the ECU 90 corresponds to a decision section, and S170 performed by the ECU 90 corresponds to an assistance section. The weak operation mode corresponds to a first mode, the strong operation mode corresponds to a second mode, the low probability value corresponds to first and third probability values, and the high probability value corresponds to second and fourth probability values.

The present disclosure is not limited to the embodiments described herein, and is achievable with various configurations without departing from the spirit of the present disclosure. For example, the technical features in the embodiments corresponding to the technical features in the respective aspects described later can be replaced or combined appropriately, to solve a part or all of the above-described problems or to attain a part of or all of the advantageous effects described herein. Unless such technical features are described herein as essential ones, they can be deleted, as necessary. The following embodiments are given as examples.

In the second determination, in a case where the guide route includes making a turn, the probability of making a turn may be determined to be high, when a driver turns the steering wheel to make a turn in accordance with the guide route.

The course change is not limited to making a turn, and may include at least any of the lane change, turning to the left, and turning to the right. The course change may include at least any of the lane change, turning to the left, and turning to the right, without including making a turn.

The ECU 90, by recording a location point where making a turn or the lane change was conducted in the past, may determine that the probability of the course change is high when the vehicle travels in the vicinity of such a location point. The location point where making a turn or the lane change was conducted in the past is one type of the information related to the traveling situation.

With the use of a traveling history of the own vehicle, the scene where the course change probability is high may be determined. The traveling history of the own vehicle is one type of the information related to the traveling situation. The traveling history denotes information indicating at which location point, how frequently the own vehicle traveled in the past. In a case of a road on which the own vehicle travels frequently, the probability of making the course change, such as making a turn, is estimated to be low. On the other hand, in a case of a road on which the own vehicle travels for the first time, the route is easily mistaken. The probability of a sudden course change, such as making a turn, is estimated to be higher.

In the second embodiment, without using the information that has been acquired from the route guidance device 42, only the information that has been acquired from the microphone 43 may be used.

In the second embodiment, a device for carrying out the voice recognition may be additionally included. This device decides the probability value in the second determination, and inputs the probability value to the ECU 90.

The external field sensors 30 may include at least one sensor. The sensors included in the external field sensors 30 are not limited to those that have been given as examples in the embodiments. For example, any frequency bandwidth of the radars may be applicable. A stereo camera, a LIDAR, an ultrasonic sensor, or the like may be used. LIDAR is an abbreviation of Light Detection And Ranging.

In a case where the operation mode is made stronger, the operation timing of the automatic brake or the alarm may be made earlier, and in addition, the operation degree may be stronger, or the operation period may be longer. For example, the braking force of the automatic brake may be stronger, the volume of an alarm sound may be increased, or the alarm sound may continue for a longer period of time.

The operation modes of the automatic brake and the alarm may not necessarily be changed in association with each other, and may be changed independently. For example, the operation mode of the alarm only may be changed.

The probability value determinations in the first and second determinations may take any stages. For example, two stages may be applicable.

The decision of the operation mode in accordance with a combination of the probability values of the first and second determinations is not limited to the example illustrated in FIG. 7. For example, the probability value may be calculated by numerical values, and the operation mode may be decided in accordance with a sum or product of two probability values.

The collision avoidance assistance device may not necessarily be the ECU 90. The collision avoidance assistance device may be constituted by, for example, plural ECUs in cooperation with each other. Alternatively, the collision avoidance assistance device may be a computer incorporated into any of the components of the external field sensors 30. For example, the collision avoidance assistance device may be a camera ECU incorporated into either one of the front camera 34 or the rear camera 35, or may be a computer incorporated into the rear lateral side radar 33.

In the above-described embodiments, a part or all of the functions and processes implemented by software may be implemented by hardware. Further, a part or all of the functions and processes implemented by hardware may be implemented by software. As hardware, for example, various circuits may be used, such as an integrated circuit, a discrete circuit, or a circuit module in combination of those circuits.

An aspect of the present disclosure is a collision avoidance assistance device (90) of a vehicle (10). The vehicle includes: information output devices (20) that output information for detecting an obstacle, information for recognizing a road structure in a traveling direction, and information related to a traveling situation of the vehicle; internal field sensors (50) that detect a state quantity of the vehicle; and a collision avoidance assistance mechanism (80) for assisting in avoidance of a collision with the obstacle. The collision avoidance assistance device includes: a first determination section (S110, S120, S130) that determines a probability that the vehicle changes course, by using a recognition result of the road structure by the information output devices and a detection result by the internal field sensors; a second determination section (S140) that determines the probability that the vehicle changes course, by using the information related to the traveling situation output by the information output devices; a decision section (S150) that decides (selects) an operation mode of collision avoidance assistance using the collision avoidance assistance mechanism, by using a combination of a determination result of the first determination section and a determination result of the second determination section; and an assistance section (S170) that performs a process for controlling the collision avoidance assistance mechanism in the operation mode that has been decided (selected) by the decision section, upon detection of a collision probability with the obstacle using the information output by the information output devices (S160, YES).

According to this aspect, with the use of the information for recognizing the road structure in the traveling direction and the information related to the traveling situation of the vehicle, the driver's intention of changing course can be estimated appropriately. In addition, the operation mode of the collision avoidance can be decided (selected) in accordance with an estimated result of the driver's intention. Therefore, the collision avoidance can be assisted appropriately.

What is claimed is:

1. A collision avoidance assistance device of a vehicle, the vehicle including:
   information output devices that output information for detecting an obstacle, information for recognizing a road structure in a traveling direction, and information related to a traveling situation of the vehicle;
   internal field sensors that detect a state quantity of the vehicle, the state quantity indicating an operating state of the vehicle; and
   a collision avoidance assistance mechanism for assisting in avoidance of a collision with the obstacle,
   the collision avoidance assistance device comprising:
   a first determination section that determines a probability that a driver of the vehicle intends to change a course of the vehicle, by
      (i) using, as a recognition result, the information for recognizing the road structure in the traveling direction output by the information output devices and
      (ii) using, as a detection result, the state quantity of the vehicle comprising a predicted change in steering angle over time as the vehicle travels and information from the internal field sensors;
   a second determination section that determines the probability that the driver of the vehicle intends to change the course of the vehicle, by using the information related to the traveling situation of the vehicle output by the information output devices;
   a decision section that decides an operation mode of collision avoidance assistance using the collision avoidance assistance mechanism, by using a combination of a determination result of the first determination section and a determination result of the second determination section; and
   an assistance section that performs a process for controlling the collision avoidance assistance mechanism in the operation mode that has been decided by the decision section, upon detection of a collision probability with the obstacle using the information output by the information output devices.

2. The collision avoidance assistance device according to claim 1, wherein the operation mode of the assistance section includes a first mode, and a second mode for providing stronger assistance than in the first mode,
   the first determination section determines the probability with at least two stages including a first probability value, and a second probability value higher than the first probability value,
   the second determination section determines the probability with at least two stages including a third probability value, and a fourth probability value higher than the third probability value, and
   the decision section decides the first mode in a case where the determination result of the first determination section is the first probability value and the determination result of the second determination section is the third probability value, and decides the second mode in a case where the determination result of the first determination section is the third probability value and the determination result of the second determination section is the fourth probability value.

3. The collision avoidance assistance device according to claim 1,
   wherein the information output devices include a rear lateral side radar having a detection range that is a rear lateral side of the vehicle, as a device that outputs the information for detecting the obstacle.

4. The collision avoidance assistance device according to claim 1, wherein the information output devices include a microphone that acquires a voice, as a device that outputs the information related to the traveling situation of the vehicle, and
   the second determination section, upon detection that a passenger on the vehicle has made an utterance about a course change of the vehicle by using the voice that has been acquired by the microphone, determines that the probability is higher than a case where the utterance about the course change is not detected.

5. The collision avoidance assistance device according to claim 1, wherein the information output devices include a route guidance device as a device that outputs the information related to the traveling situation of the vehicle, and
   the second determination section, in a case of traveling on a different route from a guide route by the route guidance device, determines that the probability is higher than a case of traveling along the guide route.

6. The collision avoidance assistance device according to claim 1, wherein
   the information output devices include at least any of a route guidance device and a camera that has an imaging range including an area in front of the vehicle, as a device that outputs the information for recognizing the road structure in the traveling direction.

7. The collision avoidance assistance device according to claim 1, wherein the internal field sensors include at least any of a steering angle sensor, a yaw rate sensor, and a device that outputs a flashing state of a blinker, and
   the first determination section determines the probability, by estimating whether the vehicle is traveling along a road by using the recognition result of the road structure by the information output devices and the detection result by the internal field sensors.

8. The collision avoidance assistance device according to claim 1, wherein
   the probability that the driver intends to change the course of the vehicle comprises a probability that the driver intends to make a turn.

9. A storage medium that stores a program causing a computer of a vehicle, which includes: information output devices that output information for detecting an obstacle, information for recognizing a road structure in a traveling direction, and information related to a traveling situation of the vehicle; internal field sensors that detect a state quantity of the vehicle, the state quantity indicating an operating state of the vehicle; and a collision avoidance assistance mechanism for assisting in avoidance of a collision with the obstacle, to perform:

performing a first determination of determining a probability that a driver of the vehicle intends to change a course of the vehicle, by
  (i) using, as a recognition result, the information for recognizing the road structure in the traveling direction output by the information output devices and
  (ii) using, as a detection result, the state quantity of the vehicle comprising a predicted change in steering angle over time as the vehicle travels and information from the internal field sensors;
performing a second determination of determining the probability that the driver of the vehicle intends to change the course of the vehicle, by using the information related to the traveling situation of the vehicle output by the information output devices;
deciding an operation mode of collision avoidance assistance using the collision avoidance assistance mechanism, by using a combination of a determination result of the first determination and a determination result of the second determination; and
performing a process for controlling the collision avoidance assistance mechanism in the operation mode that has been decided, upon detection of a collision probability with the obstacle using the information output by the information output devices.

10. The storage medium according to claim 9, wherein the operation mode of collision avoidance assistance includes a first mode, and a second mode for providing stronger assistance than in the first mode,
  the first determination determines the probability with at least two stages including a first probability value, and a second probability value higher than the first probability value,
  the second determination determines the probability with at least two stages including a third probability value, and a fourth probability value higher than the third probability value, and
  the operation mode of collision avoidance assistance is decided as the first mode in a case where the determination result of the first determination is the first probability value and the determination result of the second determination is the third probability value and decided as the second mode in a case where the determination result of the first determination is the third probability value and the determination result of the second determination is the fourth probability value.

11. The storage medium according to claim 9, wherein the information output devices include a rear lateral side radar having a detection range that is a rear lateral side of the vehicle, as a device that outputs the information for detecting the obstacle.

12. The storage medium according to claim 9, wherein the information output devices include a microphone that acquires a voice, as a device that outputs the information related to the traveling situation of the vehicle, and
  the second determination, upon detection that a passenger on the vehicle has made an utterance about a course change of the vehicle by using the voice that has been acquired by the microphone, determines that the probability is higher than a case where the utterance about the course change is not detected.

13. The storage medium according to claim 9, wherein the information output devices include a route guidance device as a device that outputs the information related to the traveling situation of the vehicle, and
  the second determination, in a case of traveling on a different route from a guide route by the route guidance device, determines that the probability is higher than a case of traveling along the guide route.

14. The storage medium according to claim 9, wherein the information output devices include at least any of a route guidance device and a camera that has an imaging range including an area in front of the vehicle, as a device that outputs the information for recognizing the road structure in the traveling direction.

15. The storage medium according to claim 9, wherein the internal field sensors include at least any of a steering angle sensor, a yaw rate sensor, and a device that outputs a flashing state of a blinker, and
  the first determination determines the probability, by estimating whether the vehicle is traveling along a road by using the recognition result of the road structure by the information output devices and the detection result by the internal field sensors.

16. A collision avoidance assistance method by a collision avoidance assistance device of a vehicle, the vehicle including:
  information output devices that output information for detecting an obstacle, information for recognizing a road structure in a traveling direction, and information related to a traveling situation of the vehicle;
  internal field sensors that detect a state quantity of the vehicle, the state quantity indicating an operating state of the vehicle; and
  a collision avoidance assistance mechanism for assisting in avoidance of a collision with the obstacle,
  the collision avoidance assistance method comprising:
  performing a first determination of determining a probability that a driver of the vehicle intends to change a course of the vehicle, by
    (i) using, as a recognition result, the information for recognizing the road structure in the traveling direction output by the information output devices and
    (ii) using, as a detection result, the state quantity of the vehicle comprising a predicted change in steering angle over time as the vehicle travels and information from the internal field sensors;
  performing a second determination of determining the probability that the driver of the vehicle intends to change the course of the vehicle, by using the information related to the traveling situation of the vehicle output by the information output devices;
  deciding an operation mode of collision avoidance assistance using the collision avoidance assistance mechanism, by using a combination of a determination result of the first determination and a determination result of the second determination; and
  performing a process for controlling the collision avoidance assistance mechanism in the operation mode that has been decided, upon detection of a collision probability with the obstacle using the information output by the information output devices.

17. The collision avoidance assistance method according to claim 16, wherein the operation mode of collision avoidance assistance includes a first mode, and a second mode for providing stronger assistance than in the first mode,
  the first determination determines the probability with at least two stages including a first probability value, and a second probability value higher than the first probability value, the second determination determines the probability with at least two stages including a third probability value, and a fourth probability value higher than the third probability value, and the operation mode is decided as the first mode in a case where the determination result of the first determination is the first probability value and the determination result of the second determination is the third probability value, and decided as the second mode in a case where the determination result of the first determination is the third probability value and the determination result of the second determination is the fourth probability value.

18. The collision avoidance assistance method according to claim 16, wherein the information output devices include a rear lateral side radar having a detection range that is a rear lateral side of the vehicle, as a device that outputs the information for detecting the obstacle.

19. The collision avoidance assistance method according to claim 16, wherein the information output devices include a microphone that acquires a voice, as a device that outputs the information related to the traveling situation of the vehicle, and the second determination, upon detection that a passenger on the vehicle has made an utterance about a course change of the vehicle by using the voice that has been acquired by the microphone, determines that the probability is higher than a case where the utterance about the course change is not detected.

20. The collision avoidance assistance method according to claim 16, wherein the information output devices include a route guidance device as a device that outputs the information related to the traveling situation of the vehicle, and the second determination, in a case of traveling on a different route from a guide route by the route guidance device, determines that the probability is higher than a case of traveling along the guide route.

21. The collision avoidance assistance method according to claim 16, wherein the information output devices include at least any of a route guidance device and a camera that has an imaging range including an area in front of the vehicle, as a device that outputs the information for recognizing the road structure in the traveling direction.

* * * * *